B. W. HURD.
AIR GAGE.
APPLICATION FILED JAN. 14, 1918.

1,291,901. Patented Jan. 21, 1919.

WITNESSES:
George E. Mercer
R. G. Twycross

INVENTOR
Benjamin W. Hurd.

UNITED STATES PATENT OFFICE.

BENJAMIN W. HURD, OF SIERRA MADRE, CALIFORNIA.

AIR-GAGE.

1,291,901. Specification of Letters Patent. Patented Jan. 21, 1919.

Application filed January 14, 1918. Serial No. 211,822.

*To all whom it may concern:*

Be it known that I, BENJAMIN W. HURD, a citizen of the United States, residing at Sierra Madre, in the county of Los Angeles, State of California, have invented a new and useful Improvement in Air-Gages, of which the following is a specification.

This invention relates to a gage which is designed to show the pressure in pneumatic tires, such as are used on automobiles, bicycles, motorcycles and other vehicles.

The object of the invention is to provide a gage of a simple construction and few parts, small enough so that it may remain on the tire when the tire is inflated, and which may be easily read when the tire is stationary.

The gage which is illustrated as an embodiment of the invention has a base, a body, and a cap, inclosing a diaphragm upon which rests a pivot supporting a screw which passes through a spring case mounted on ball bearings, and a sleeve in the cap. This screw has a right hand thread on one end, and a left hand thread on the other end, the spring case has a thread in the bottom where the screw passes through and the sleeve has a thread of the opposite hand.

When the screw is pushed up, the thread in the sleeve rotates the spring case one-half turn, at the same time the passage of the screw through the thread in the spring case rotates the spring case a half turn in the same direction, the spring case thread and sleeve thread being of opposite hands, thus giving the spring case a full revolution to one-half revolution of the screw. An easy working angle is given to the screw, and one which will give a full revolution to the spring case with a small movement of the diaphragm.

The conical spring around the screw exerts a downward pressure on the diaphragm balancing the pressure of the air.

The spring inside the spring case keeps the screw down onto the diaphragm and shows the pressure in the tire by figures on the outer circumference of the spring case.

The number showing the pressure is seen through the window in the cap, and the air is let into the gage by a thimble held in the packing washer in the base.

Figure 2:
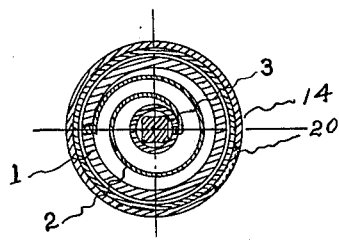
Figure 4:
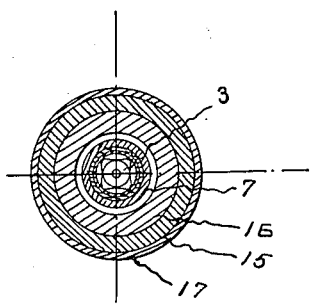
Figure 1:
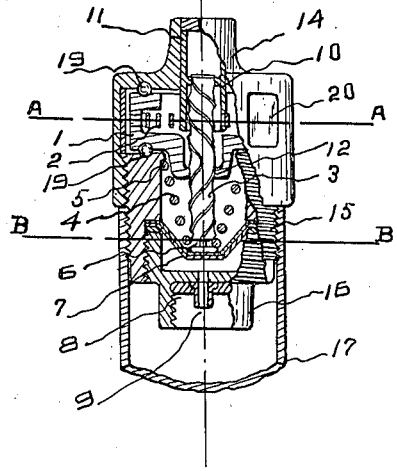
Figure 3:
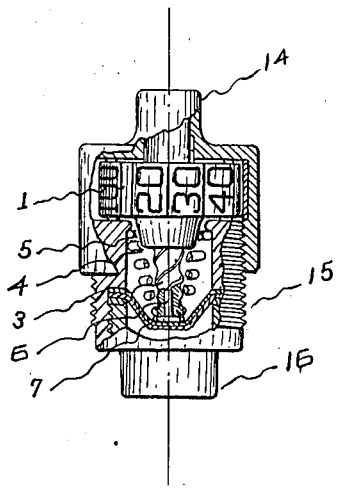

Figure 1 of the accompanying drawings is a partly sectional elevation of the gage with the cap 14, body 15, and base 16, partly broken away. Fig. 2 is a section at line A—A showing spring case 1, cap 14, screw 3, and spring 2; Fig. 3 is a partly sectional elevation showing spring case with figures. Fig. 4 is a section at line B—B of Fig. 1. Fig. 1 is broken away to show spring case 1 and screw 3 which is in the lowest position where there is no pressure on the gage. The conical spring 4 exerts its pressure between diaphragm 7 and its seat 5 in body 15. Pivot 6 in the end of screw 3 keeps the screw 3 from twisting the diaphragm 7, whenever the pressure forces the diaphragm 7 up, or the conical spring 4 forces the diaphragm 7 down.

When the gage is screwed onto the valve stem of the tire, the top of the stem seats onto the packing washer 8, which has a thimble 9 in the center which presses onto and opens the valve allowing the air to press onto the diaphragm 7.

As diaphragm 7 rises under the pressure it pushes up the conical spring 4 and screw 3 through their contact with pivot 6.

As the screw rises it turns as it passes through thread 10 in sleeve 11 carrying spring-case 1 with it; at the same time the screw of the opposite hand passing through thread 12 in spring-case 1 revolves spring-case 1 on the ball bearings 19, making drum 1 revolve a full turn while screw 3 makes one-half turn.

The spring 2 inside spring-case 1 keeps a constant pressure on the screw 3 forcing it down onto diaphragm 7, in this way indicating every movement of the diaphragm, numbers showing the pressure being indented or otherwise made on the circumference of the spring case 1 which are seen through window 20 in cap 14.

Tube 17 is used as a dust cap to protect the valve stem threads from dirt, and also to stiffen the gage.

The invention claimed is:

1. The combination in an air gage to show the pressure in auto tires, of a casing made up of a body, a base, and a cap screwing together to form said casing, a stationary screw thread being formed in the top of said cap, there being a window or opening in the side of said cap, a bushing of transparent substance covering or closing the opening on the side of said cap, and a spring drum having position identifying marks on its circumference and inclosing a spring to retract said drum toward and to its first position inside of said casing and mounted on ball-bearings near its circumference to rotate inside and between the body and cap of said casing, said drum having a screw thread formed on its lower end of the opposite hand of the screw thread in the cap, a multiple threaded right and left hand screw, one thread of said screw passing through the screw thread in said spring drum, the opposite hand thread of said screw passing through the screw thread in said cap, the upward movement of said screw rotating said drum a full revolution to a partial revolution of said screw, a flexible diaphragm which is fastened by its outside edges inside and between the body and base of said casing, a pivot in the base of said screw resting on said diaphragm and a conical spring inside said casing and around said screw bearing on the pivot in said screw, to counteract the pressure of the air below said diaphragm, and a packing washer in said base having a hollow thimble to force down the valve stem to let air against said diaphragm.

2. The combination in an air pressure gage of a body, a base, a cap and a spring case, said cap and case each having screw threads therein, a multiple threaded right and left hand screw to rotate said spring case in said screw's upward movement by the passing of the threads on said screw through the threads in the cap and spring case; a means for forcing said screw upward, a means for returning said screw to its first position, said body, base, and cap forming a casing to inclose said spring case, screw and operating means, a packing washer in said base having a hollow thimble adapted to force down the valve stem of a tire valve when applied thereto to let air through said packing washer, there being an opening cut through said cap and a transparent substance closing said opening so the outer circumference of the said spring case can be seen.

BENJAMIN W. HURD.

Witnesses:
GEORGE E. MESECAR,
S. R. G. TWYCROSS.